United States Patent
Taylor et al.

(10) Patent No.: US 7,602,134 B1
(45) Date of Patent: Oct. 13, 2009

(54) TWIST CAPSULE FOR ROTATABLE PAYLOAD

(75) Inventors: Scott Taylor, Healdsburg, CA (US); Allan A. Voigt, Geyserville, CA (US); Alan Wardlow, Santa Rosa, CA (US); Tim McCarthy-Smith, Santa Rosa, CA (US)

(73) Assignee: L-3 Communications Sonoma EO, Inc., Santa Rosa, CA (US)

( * ) Notice: Subject to any disclaimer, the term of this patent is extended or adjusted under 35 U.S.C. 154(b) by 440 days.

(21) Appl. No.: 11/458,908

(22) Filed: Jul. 20, 2006

(51) Int. Cl.
*B64C 17/02* (2006.01)

(52) U.S. Cl. ............... 318/648; 439/21; 439/11; 439/67; 439/18; 439/20; 310/232; 310/237

(58) Field of Classification Search ............ 439/21, 439/11, 67, 13, 18, 20–22, 27, 77, 492; 310/232, 310/237; 74/5 R, 5.6 D, 504.12, 436, 84 R, 74/5.47, 5.9, 232; 248/544, 186, 74.5 F, 248/160, 289.3; 339/8 R, 103 M, 52; 188/266.4; 318/648

See application file for complete search history.

(56) References Cited

U.S. PATENT DOCUMENTS

| | | | |
|---|---|---|---|
| 3,396,586 A | | 8/1968 | Maclin et al. |
| 3,664,199 A | * | 5/1972 | Lahde ............... 74/5.6 D |
| 3,837,229 A | | 9/1974 | Stiles et al. |
| 4,033,541 A | * | 7/1977 | Malueg ............... 248/550 |
| 4,046,441 A | | 9/1977 | Harley |
| 4,052,654 A | * | 10/1977 | Kramer et al. ............ 318/649 |
| 4,098,546 A | * | 7/1978 | Swartz et al. ............ 439/20 |
| 4,267,737 A | | 5/1981 | O'Connor et al. |
| 4,318,522 A | * | 3/1982 | Appleberry ............ 248/179.1 |
| 4,332,365 A | | 6/1982 | Berk |
| 4,498,038 A | * | 2/1985 | Malueg ............... 318/648 |
| 4,558,325 A | * | 12/1985 | Stroem ............... 343/765 |
| 4,665,764 A | | 5/1987 | Inoue et al. |
| 4,791,727 A | * | 12/1988 | Hojo et al. ............ 33/325 |
| 5,272,922 A | * | 12/1993 | Watson ............... 73/504.16 |
| 5,484,294 A | | 1/1996 | Sobhani |
| 6,129,307 A | * | 10/2000 | Deoms et al. ............ 244/3.16 |
| 6,386,886 B1 | * | 5/2002 | Filaretos ............... 439/21 |
| 6,578,967 B1 | * | 6/2003 | Paddock et al. ............ 352/243 |
| 6,690,007 B2 | * | 2/2004 | Daimon ............... 250/306 |
| 2004/0226656 A1 | * | 11/2004 | Walsh et al. ............ 156/345.12 |
| 2005/0178237 A1 | * | 8/2005 | Fu ............... 74/595 |
| 2007/0139752 A1 | * | 6/2007 | Bernstein et al. ............ 359/224 |

* cited by examiner

*Primary Examiner*—Rita Leykin
(74) *Attorney, Agent, or Firm*—Pillsbury Winthrop Shaw Pittman LLP

(57) ABSTRACT

The present invention relates to an apparatus that controllably allows the relative rotation between structures, such as a gimbal and a structure to which it is mounted. According to one aspect, the apparatus includes a twist capsule assembly with internal stop mechanisms that controllably prevents the amount of clockwise and counterclockwise rotation with respect to a rotation axis. According to another aspect of the invention, by limiting the amount of relative rotation, other means of communicating power and signals between the structures can be used, thus avoiding or reducing the limitations imposed by conventional slip ring assemblies. According to yet another aspect, the invention includes techniques and structures for allowing conventionally shielded cables and wires to be used in place of slip rings, while allowing for rotation between structures, thus even further improving the communication of power and signals between structures.

22 Claims, 3 Drawing Sheets

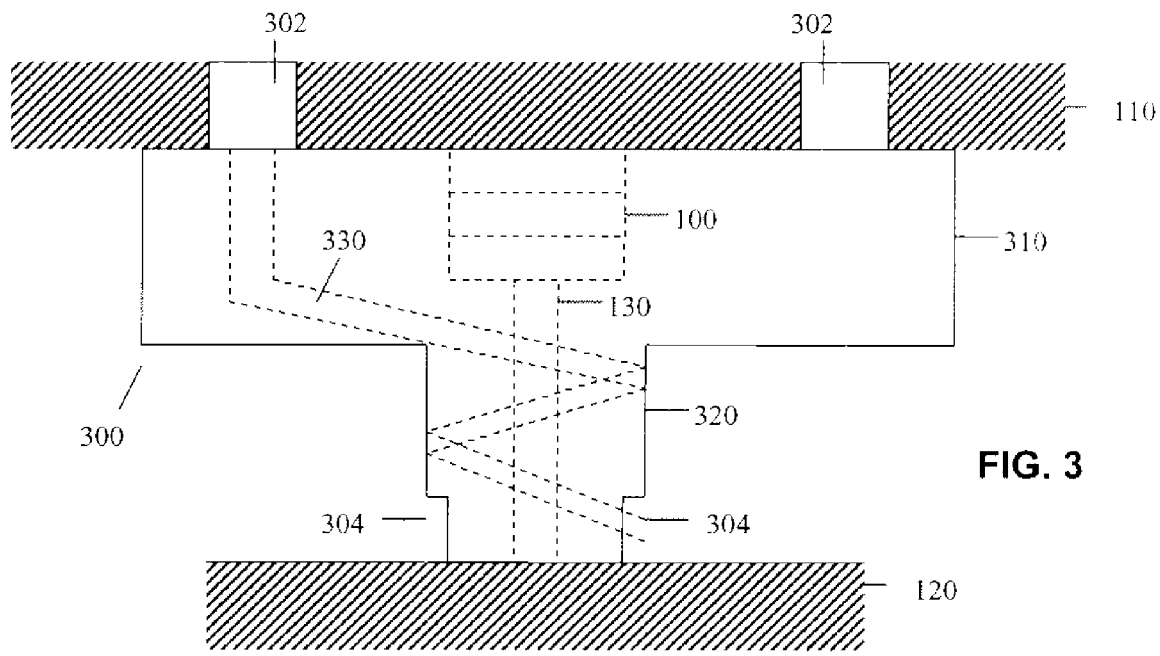
FIG. 3
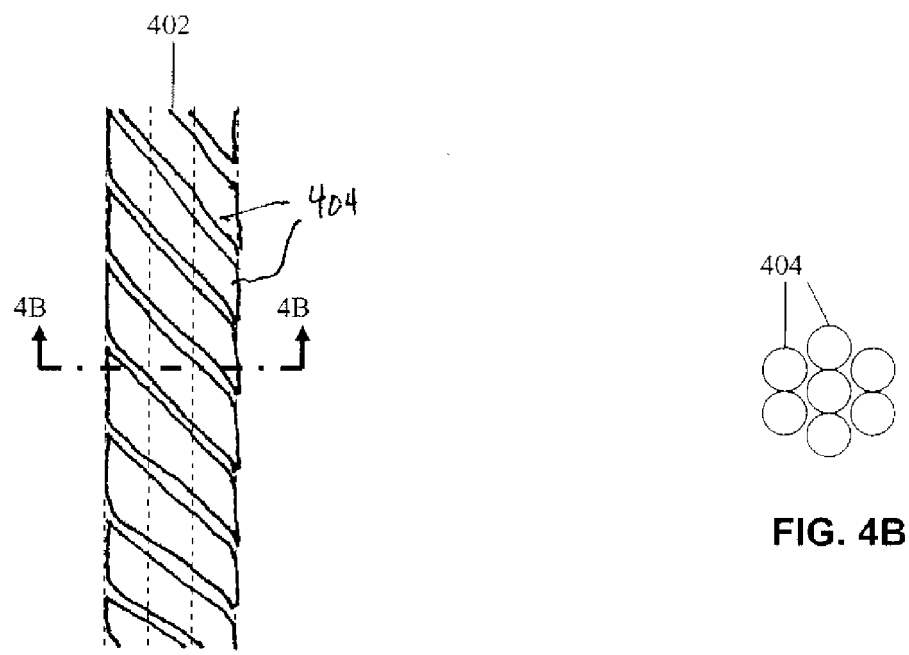
FIG. 4A
FIG. 4B

TWIST CAPSULE FOR ROTATABLE PAYLOAD

FIELD OF THE INVENTION

The present invention relates to assemblies for supporting relative rotation between two structures such as gimbals attached to vehicles, and more particularly to assemblies for providing a limited amount of relative rotation, while supporting the provision of power and signals between components in the separate structures.

BACKGROUND OF THE INVENTION

As is known, some types of gimbals can include sensors for collecting image and other data, as well as gyroscopes for maintaining an orientation of such sensors. Such gimbals are sometimes mounted to structures such as vehicles (e.g. airplanes, motor vehicles and marine vessels) in a rotatable fashion such that they can rotate about a gimbal axis (e.g. azimuth). In such circumstances, a rotatable gimbal support or mount structure can include slip ring assemblies for providing power and signal information to and from inertial components such as sensors and motors within the gimbal (e.g. through brush-ring coupling). Typically, these slip ring assemblies also provide for unlimited rotation of the gimbal (e.g. 360 degrees) about the gimbal axis with respect to the fixed structure or vehicle.

In many applications, such as where sensor information is in the form of high frequency and/or digital signals, the noise produced by conventional slip ring assemblies becomes unacceptable. However, given the need to allow for relative rotation between a gimbal and a structure to which it is mounted, one cannot simply replace the power and signaling provided through such slip ring assemblies with conventional shielded wires and cabling, especially within similar volumes used by slip ring assemblies. Accordingly, there remains a need in the art for a solution that allows for relative rotation between structures such as gimbals while also allowing for the communication of power and signals to the gimbal.

SUMMARY OF THE INVENTION

The present invention relates to an apparatus that controllably allows the relative rotation between structures, such as a gimbal and a structure to which it is mounted. According to one aspect, the apparatus includes a twist capsule assembly with internal stop mechanisms that controllably prevents the amount of clockwise and counterclockwise rotation with respect to a rotation axis. According to another aspect of the invention, by limiting the amount of relative rotation, other means of communicating power and signals between the structures can be used, thus avoiding or reducing the limitations imposed by conventional slip ring assemblies. According to yet another aspect, the invention includes techniques and structures for allowing conventionally shielded cables and wires to be used in place of slip rings, while allowing for rotation between structures, thus even further improving the communication of power and signals between structures. According to yet another aspect, the invention includes techniques for minimizing stress on conventionally shielded cables and wires used in place of slip rings, while allowing for rotation between structures, thus enhancing the reliable lifetime of the system.

In furtherance of these and other objects, an apparatus according to the invention, coupled between first and second structures, comprises a first portion that rotates in accordance with the first structure, a second portion that rotates in accordance with the second structure, and a rotation prevention mechanism coupled to the first and second portions to control relative rotation between the first and second structures within a predetermined range. In additional furtherance of these and other objects, in certain embodiments the rotation prevention mechanism comprises a pin formed on the first portion that travels in a radial groove formed in the second portion during relative rotation between the first and second structures, and a stop formed in the radial groove that limits travel of the pin.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein:

FIG. 3 illustrates further aspects of communicating power and/or signals between structures using an apparatus such as that illustrated in FIG. 1;

FIGS. 4A and 4B illustrate one example of how wires can be bundled within an enclosure such as that shown in FIG. 3;

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

Generally, the present invention recognizes that complete freedom of relative rotation between two structures is not necessary in all applications. However, at least one complete rotation is generally needed. By limiting the amount of relative rotation, while allowing for at least approximately one complete rotation, more conventional means of providing power and signals, such as through shielded wires, can be used, thus eliminating or reducing the noise problem afflicting conventional slip ring assemblies.

Figure 1:
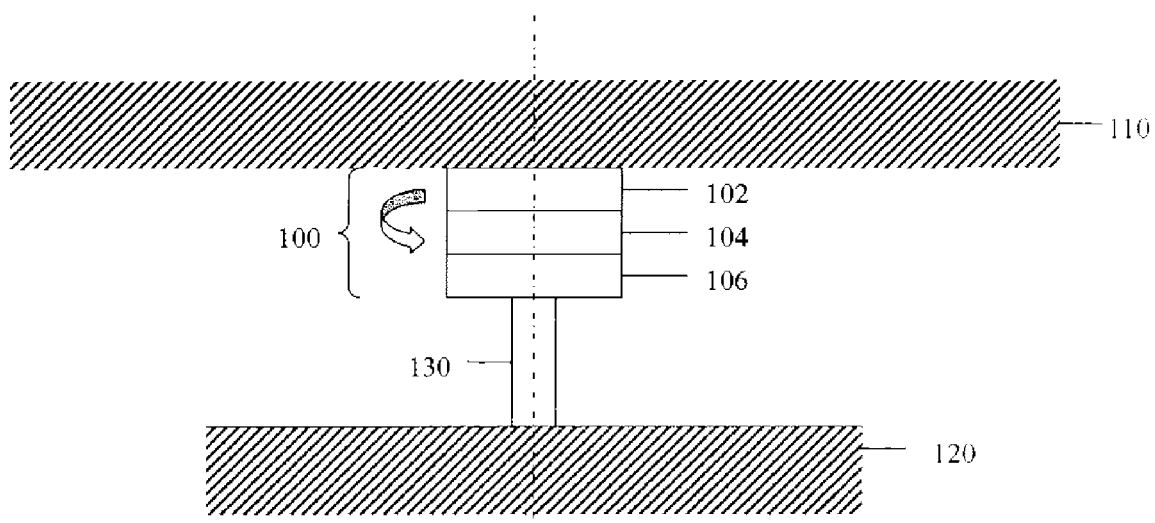
FIG. 1 illustrates an example implementation of an apparatus for providing relative rotation between two structures according to the principles of the invention.

FIG. 1 illustrates one example implementation of the present invention.

As shown in FIG. 1, a twist capsule 100 according to the invention is disposed on a shaft 130 between a mount structure 110 and a rotatable payload 120. Shaft 130 is fixedly attached to payload 120 and payload 120 rotates about an axis (e.g. azimuth) through the center of shaft 130 under control of one or more motors (not shown). In one preferred example, payload 120 is a gimbal that may further provide additional mechanisms for rotating or displacing payload components (not shown) along other axes (e.g. elevation, etc.). In this example, mount structure 110 can be part of a top hat upper mount for a gimbal.

It should be apparent that other support structures can be used in addition to those shown in FIG. 1, such as pivots and harnesses, and so twist capsule 100 need not by itself attach or support payload 120 from structure 110. However, details and illustrations of such other support structures will be omitted so as not to obscure the invention.

In the example of FIG. 1, twist capsule 100 includes three rings 102, 104 and 106. Top ring 102 is fixedly attached to the mount structure 110, and bottom ring 106 is fixedly attached to shaft 130. Accordingly, the relative rotation between mount structure 110 and payload 120 is determined by the amount of rotation allowed between ring 102 and 106, as will be explained in more detail below. Center ring 104 provides a predetermined additional amount of rotation between rings 102 and 106 in a manner that will also be described in more detail below. It should be noted that center ring 104 can be omitted, or additional center rings 104 may be provided in other alternative embodiments which will become readily apparent to those skilled in the art after being taught by this example.

Figure 2:
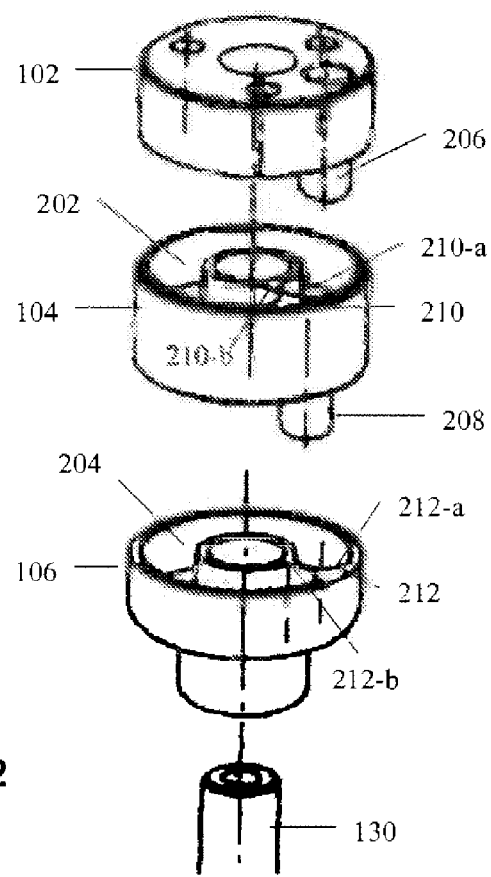
FIG. 2 illustrates an example of a twist capsule assembly that can be included in the apparatus of FIG. 1.

FIG. 2 illustrates example implementations of rings 102, 104 and 106 in more detail. As shown in FIG. 2, rings 104 and 106 include radial grooves 202 and 204, respectively, which accept pins 206 and 208 or rings 102 and 204, respectively. Rings 104 and 106 further include stops 210 and 212, respectively. When assembled together (e.g., they are held in place through other support structures not shown), pins 206 and 208 travel in grooves 202 and 204 respectively as payload 120 rotates with respect to mount structure 110 until both simultaneously encounter the clockwise limit edge (210-a and 212-a) or counterclockwise limit edge (210-b and 212-b) of stops 210 and 212 respectively. At that point, further rotation in the same direction is prevented. In this example, ring 104 is a "floater" ring that can continue to rotate in tandem with either ring 102 or 106 depending on which of pins 206 or 208 encounters stops 210 or 212 first, and rotation between structure 110 and payload 120 in the same direction continues. In this manner, ring 104 makes possible an additional range of possible rotation, including ranges in excess of one full rotation between structure 110 and payload 120.

As should be apparent from the foregoing descriptions, the size of the pins and stops, as well as the presence and/or number of "floater" rings in assembly 100, thus define the amount of maximum rotation permitted between mount structure 110 and payload 120. In one example, rings 102, 104 and 106 are comprised of top, center and bottom hardened steel and are about 1.125 inches in diameter, and shaft 130 is hardened steel, with a 0.375 in. diameter hexagonal cross-section. In this example implementation, the total range of possible rotation is approximately ±315 degrees, or approximately 630 degrees total rotation (i.e. about 1-¾ full rotations) between stops.

It should be noted that, in certain embodiments such as the one described above, the shaft 130 can function as a torsion bar to soften the impact in case the payload 120 is inadvertently driven into the hard stops built into the twist cap 100 or the system, either under software or manual control or force. Another benefit of the small shaft diameter is that it helps control the wire harness during wind and unwind sequences as will become more apparent from the descriptions below. In general, the small shaft means more rotation can be allowed with less space.

In certain embodiments, the amount of rotation is monitored and controlled in real-time, for example to provide soft stops. In one example implementation, the rotation is driven by a motor, which is controlled by software. Such motors and control software for rotatable payloads such as gimbals are well-known in the art, and so details thereof will be omitted here for sake of clarity. However, an aspect of the invention is that such control software can utilize positional feedback from sensors to monitor rotation in real time and prevent occurrences of the motor driving the payload into potentially damaging hard stops as fixed by twist capsule 100. For example, the software can allow quick rotation (e.g. 100 degrees/s) in areas outside of a few degrees of the hard stops, while forcing slow rotation (e.g. 10 degrees/s) within these extreme rotation edges.

Figures 6A, 6B:
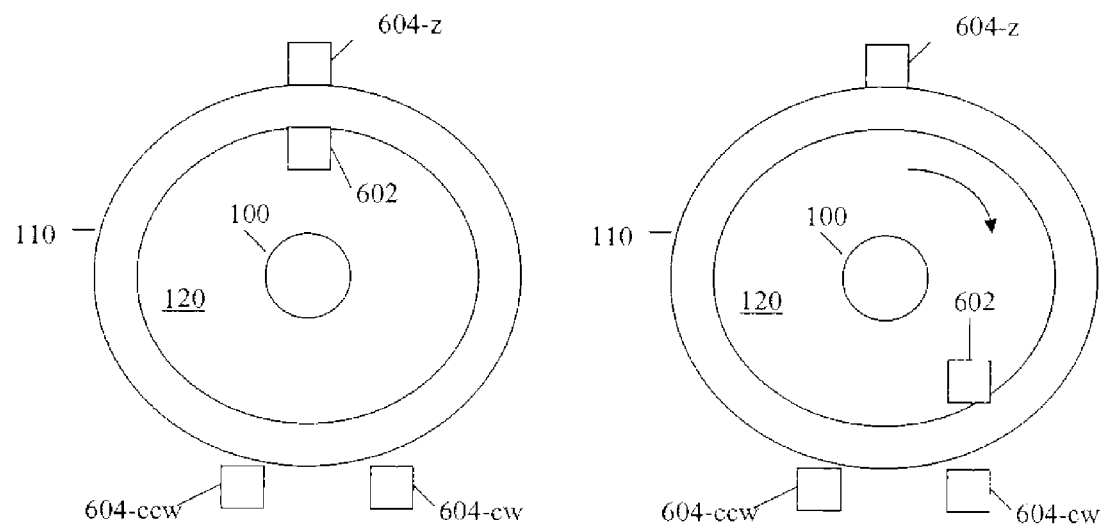
FIGS. 6A and 6B illustrate apparatuses and techniques for determining and monitoring an absolute relative rotation between two structures in accordance with aspects of the invention.

One example embodiment of providing such feedback and control is illustrated further in connection with FIGS. 6A and 6B. As shown in FIG. 6A, in a preferred embodiment of a payload whose rotation is driven by a motor tinder the control of software, there is a Hall sensor 602 mounted in the payload 120 and positioned to detect certain degrees of rotation for providing software control. For example, the Hall sensor 602 is configured to rotate past three magnets 604 mounted in the structure 110 adjacent to the payload 120. In one example where there is a range of rotation of approximately ±180 degrees or more, the magnets are positioned to coincide with relative rotations of slightly less than 180 degrees in a first, e.g. counter-clockwise direction (i.e. magnet 604-*ccw*), "zero" degrees or "home" position (i.e. magnet 604-*z*), and slightly less than 180 degrees in a second, e.g. clockwise direction (i.e. magnet 604-*cw*).

In this example where relative rotation between structure 110 and payload 120 is controlled by a motor, the motor preferably further provides encoder feedback which determines the degrees of movement away from the zero point. The control code reads the encoder feedback and fixes a "soft stop" point relative to the zero point where it reduces the velocity of the motor to not drive it at full speed into the hard stop. For example, the encoder provides multiple pulses (e.g. 4096) through the course of a single rotation. The encoder also incorporates an "index" position that occurs only once on each rotation, and is aligned to occur within the zero position Hall region and not within the two end stop Hall regions.

In order for the control code to know the absolute degree of rotation at all times during operation, an initialization sequence is performed to fix the zero point and determine the hard stops. For example, when the system powers up or when a built-in test sequence is triggered, the degree of relative rotation between payload 120 and structure 110 is unknown. The control code causes the motor to slowly drive the system in one direction until a hard stop is reached, which is detected, for example, by determining that no encoder pulses are received for a predetermined time while actively commanding the motor to turn. Once this stall condition is detected, the motor is commanded to rotate in the opposite direction while monitoring for the simultaneous occurrence of the Hall sense signal and an encoder index assertion. The control system then uses this "point" as an absolute zero reference, and uses all encoder pulses as indicating rotation relative to point. For example, the control code can calculate the range of possible rotation by counting the number of encoder pulses from the home sensor to the previously detected hard stop, and all future angular position determination can be referenced from this point. The software then causes the motor to drive the payload in the same direction of rotation quickly again to the other Hall sense signal (i.e. when the Hall sensor detects one of magnets 604-*cw* or 604-*ccw*, depending on the direction), then slows the motor again to find the end of movement as performed above. By counting the number of encoder pulses that occur in this opposite direction, the entire range of rotation from the home sensor to either hard stop can now be determined and used for future rotation control. The "soft" stops can then be programmed as a certain percentage of the full possible rotation in each direction from the home position.

FIG. 3 illustrates further aspects of the invention. Generally, instead of or in addition to using conventional slip ring mechanisms for conveying power and signals, this embodiment of the invention allows for conventional wiring and cabling to be used.

In a first embodiment shown in FIG. 3, an enclosure 300 is fixedly attached to either the mount structure 110 or the rotatable payload 120. In a manner that will be described in more detail below, signal wires and/or power cabling 330 extend from conduits 302 to feedthroughs 304, and from thence may be further routed to components in payload 120. Although only one wire/bundle/cable 330 is shown for clarity, it should be apparent that there may be two or more, including additional wires or cables between the shown or additional conduits 302 and feedthroughs 304. In one example implementation, there are two signal and two power bundles, for a total of four, although some designs have coax cables also routed through.

In one example, one or more conduits 302 include jacks such as MIL-DTL-38999 connectors from Amphenol. In this example, wires and/or cables that are routed in enclosure 300 from conduits 302 to feedthroughs 304 are soldered or otherwise electrically connected to the connectors at conduits 302 so that coupling of signal and power to/from payload 120 can be achieved by plugging mating connectors into conduits 302 from the opposite side. It should be further apparent that other conventional wire or cabling mechanisms (not shown) can be used, such as tie-downs and strain reliefs, either adjacent to conduits 302 or in other positions inside enclosure 300.

Returning to FIG. 3, enclosure 300 includes a tray portion 310 and a shroud portion 320, both with substantially cylindrical shapes centered around shaft 130, wherein the tray portion has larger outer radius from shaft 130 than the shroud portion 320. In one example, tray portion 310 has a diameter of about 6.25 in., whereas shroud portion 320 has a diameter of about 2 in. In a preferred implementation that will be described in more detail below, during rotation between structure 110 and payload 120, cables and wires are allowed to wind and unwind within tray portion 310, whereas they maintain a relatively constant amount of winding within shroud portion 320.

Wire/bundle/cable 330 can include various types and numbers of wires including shielded wires and/or bundles of same, coaxial cables, fiber optic cables, etc. However, FIGS. 4A and 4B illustrate one preferred embodiment of how wires can be bundled to even further accommodate rotation of the twist capsule according to the invention.

In this example, wires 330 comprise a bundle of seven 16-gauge silicone-jacketed wires. Silicone-jacketed wires are preferred over Teflon because these provide additional protection against friction. According to an aspect of the invention, these wires can be bundled in a fashion from standard looming practices found in wire and rope manufacturing. As shown in FIGS. 4A and 4B, a single wire 402 has six wires 404 surrounding it in a bundle of seven total wires and then loomed together with a clockwise twist. In this example, the seven wires are soldered to a seven-conductor MIL-DTL-38999 jack at conduit 302 and then loomed together as shown in FIGS. 4A and 4B and routed through enclosure 300 toward feedthrough 304. By having the bundles in the loomed fashion described, the cables naturally want to follow the clockwise twist.

Returning to the example shown in FIG. 3, bundle 330 is wound approximately one full 360 degree turn within shroud portion 320 of enclosure 300. Meanwhile, the total length of the bundle 330 within enclosure 300 preferably allows for at least two full rotations of payload 120 with respect to mount structure 110, to which conduit 302 is affixed. In one extreme position of rotation (e.g. at a full stop in one direction), the bundle 330 is not wound around shaft 130 at all within tray portion 310. At the other extreme position (e.g. at a full stop in the opposite direction of rotation), bundle 330 is wound around shaft 130 in tray portion 310 in an amount corresponding to the full range of relative rotation provided between structure 110 and payload 120. The limit of rotation provided by the hard stops in twist capsule 100 thus ensures that the winding and unwinding of the cable bundles will not exceed the fixed length.

The way this system can ensure reliability and long operating life will be appreciated from the above descriptions and foregoing remarks. Without simultaneously considering and addressing the amount of rotation, and the winding and bundling of wires during rotation, many problems can occur. For example, with too much rotation permitted or without bundling correctly, in one direction the wires limit the travel by wrapping too tightly around the shaft 130. Additionally or alternatively, in the other, unwinding, direction the limits are when the wire is no longer wrapped around the shaft 130 and begin to "double back," that is, wind in the opposite direction. Both conditions can stress the wires and in general are likely to cause an early failure of the system. By bundling and wrapping the wires with a view toward the rotation limits as described above, the objectives of high reliability long, reliable operating life can be achieved. This is especially critical in high vibration and shock environments such as those that occur during flight.

In certain embodiments, shaft 130 can further include a Teflon protector below twist capsule 100 to further protect against wear due to friction from the winding and unwinding of wires 330 around shaft 130 during rotation.

Moreover, those skilled in the art will recognize the number and arrangement of windings that are possible or desirable within enclosure 300 based on the number and size of wires, the size of the enclosure, the possible range of rotation and other factors, so details thereof will be omitted here for clarity of the invention.

Many alternative embodiments of enclosure 300 are possible, for example depending on the numbers and types of wires that need to be provided to payload 120. One alternative embodiment is shown in FIG. 5.

Figure 5:
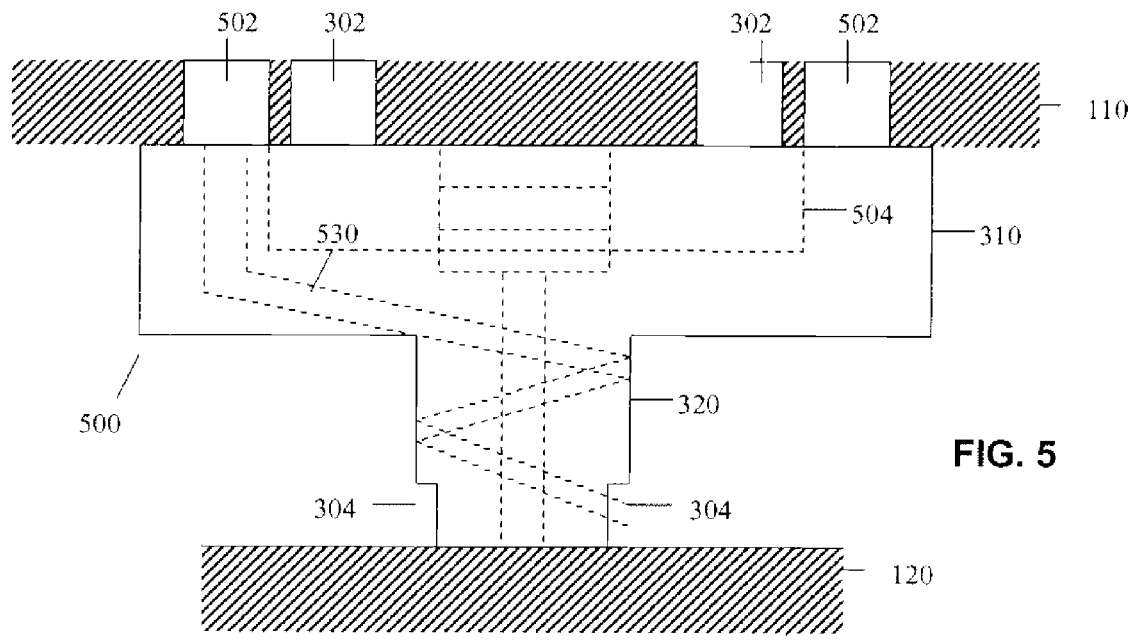
FIG. 5 illustrates an alternative embodiment of an enclosure to that shown in FIG. 3.

As shown in FIG. 5, enclosure 500 further includes an inner tray 504 to separate two or more separate types of cables and/or wires. For example, cables/wires 530 can be routed from conduits 502 to feedthroughs 506, with appropriate allowances for winding and unwinding, whereas other cables and/or wires (not shown) extending from conduits 302 may be confined within tray 504 before extending to shroud portion 320.

In one example, cables/wires 530 can be a bundle of fiber optic cables, whereas wires housed in tray 504 (not shown) may be signal/power wires such as wires 330 that are bundled as described above and exit through holes 304. In this example implementation, the twist capsule limits rotation to less than approximately ±80 degrees, or less than one full rotation.

In one example, the fiber optic cables in tray 504 are wound approximately five times around shaft 130 at one stop, and about four times at the other stop, and wind/unwind within tray portion 310 of enclosure 300 with a clock spring-like contraction and expansion. More particularly, bundle 530 will not travel down shroud portion 320. Rather, bundle 530 will clock spring wrap in the tray area formed between 310 and 504, and exit enclosure 500 through hole 506. It does not exit through feedthroughs 304, but is secured to the outside of 320. Therefore, all the clock-spring motion of bundle 530 occurs in the area between 310 and 504. Bundle 330 simultaneously coils up in tray 504 and then wraps around shaft 130, through shroud portion 320 and exits at 304 as described above. Therefore, bundles 530 and 330 rotate at the same time with respect to each other and the fixed surfaces 110 and 120, but do not come in contact with each other during the rotation.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. An apparatus coupled between first and second structures, comprising:
   a first portion that rotates in accordance with the first structure;
   a second portion that rotates in accordance with the second structure;
   a rotation prevention mechanism coupled to the first and second portions to control relative rotation between the first and second structures within a predetermined range; and
   a feedback mechanism to monitor the relative rotation between the first and second structures.

2. An apparatus coupled between first and second structures, comprising:
   a first portion that rotates in accordance with the first structure;
   a second portion that rotates in accordance with the second structure;
   a rotation prevention mechanism coupled to the first and second portions to control relative rotation between the first and second structures within a predetermined range,
   a spacer portion between the first and second portions,
   wherein the rotation prevention mechanism includes:
   a first pin formed on the first portion that can travel in a first radial groove formed in the spacer portion during relative rotation between the first and second structures;
   a second pin formed on the spacer portion that can travel in a second radial groove formed in the second portion during relative rotation between the first and second structures; and
   first and second stops formed in the first and second radial grooves that limit travel of the first and second pins, respectively, and
   wherein the spacer portion comprises one or more separately rotatable portions.

3. An apparatus according to claim 1, wherein the rotation prevention mechanism comprises:
   a pin formed on the first portion that travels in a radial groove formed in the second portion during relative rotation between the first and second structures; and
   a stop formed in the radial groove that limits travel of the pin.

4. An apparatus according to claim 1, further comprising control software that uses the feedback mechanism to prevent a motor from driving the relative rotation outside the predetermined range.

5. An apparatus according to claim 4, wherein the control software causes the motor to drive rotation at a first speed between positive and negative rotation positions, and at a second slower speed outside the positive and negative rotation positions.

6. An apparatus according to claim 1, wherein the feedback mechanism comprises a Hall sensor.

7. An apparatus according to claim 1, further comprising:
   a shaft fixedly attached between the second portion and the second stricture; and
   an enclosure surrounding the shaft.

8. An apparatus according to claim 7, wherein the enclosure comprises a top portion disposed adjacent to the first structure and a bottom portion disposed adjacent to the second structure.

9. An apparatus according to claim 8, wherein the top portion and bottom portion have cylindrical cross-sections, and wherein a top radius of the top portion is greater than a bottom radius of the bottom portion.

10. An apparatus according to claim 7, wherein the enclosure contains wires between the first and second structures, the wires being allowed to wind and unwind around the shaft within the enclosure during the relative rotation.

11. An apparatus according to claim 10, wherein the wires comprise a plurality of wires loomed around a center wire.

12. An apparatus according to claim 10, wherein the enclosure includes a tray to separate a first set of the wires and a second set of the wires.

13. An apparatus according to claim 1, wherein the first and second structures are included within a gimbal.

14. An apparatus for rotatably attaching a payload to a structure, comprising:
   a shaft that is fixed at a first end with respect to the structure and is fixed at an opposite end with respect to the payload;
   a twist capsule coupled to the shaft that restricts relative rotation between the payload and structure within a predetermined range; and
   a plurality of electrical wires between the payload and structure that are bundled around the shaft in accordance with the predetermined range of relative rotation between the payload and structure.

15. An apparatus according to claim 14, wherein the twist capsule comprises:
   a first portion that rotates in accordance with the structure;
   a second portion that rotates in accordance with the payload; and
   a rotation prevention mechanism coupled to the first and second portions to control relative rotation between the payload and structure within the predetermined range.

16. An apparatus according to claim 15, wherein the rotation prevention mechanism comprises:
a pin formed on the first portion that travels in a radial groove formed in the second portion during relative rotation between the first and second structures; and
a stop formed in the radial groove that limits travel of the pin.

17. An apparatus according to claim 14, further comprising a feedback mechanism to monitor the relative rotation between the payload and the structure.

18. An apparatus according to claim 17, further comprising control software that uses the feedback mechanism to prevent a motor from driving the relative rotation outside the predetermined range.

19. An apparatus according to claim 14, further comprising an enclosure surrounding the shaft and the plurality of electrical wires, wherein the wires are allowed to wind and unwind around the shaft and within the enclosure during the relative rotation.

20. An apparatus according to claim 19, wherein the enclosure comprises a top portion disposed adjacent to the first structure and a bottom portion disposed adjacent to the second structure.

21. An apparatus according to claim 20, wherein the top portion and bottom portion have cylindrical cross-sections, and wherein a top radius of the top portion is greater than a bottom radius of the bottom portion.

22. An apparatus according to claim 19, wherein the plurality of wires are loomed around a center wire.

* * * * *